United States Patent [19]

Pritchard

[11] Patent Number: 5,596,423
[45] Date of Patent: Jan. 21, 1997

[54] METHOD AND APPARATUS FOR COMPRESSION AND DECOMPRESSION OF DATA USED BY A SERIAL PRINTER

[75] Inventor: Thomas B. Pritchard, Brush Prairie, Wash.

[73] Assignee: Hewlett-Packard Company, Palo Alto, Calif.

[21] Appl. No.: 399,243

[22] Filed: Mar. 2, 1995

[51] Int. Cl.$^6$ .................................................. H04N 1/00
[52] U.S. Cl. ........................................ 358/433; 358/432
[58] Field of Search ................................ 358/432–433, 358/261.1, 261.2, 261.3, 426, 430, 451; 382/232, 234

[56] References Cited

U.S. PATENT DOCUMENTS

| | | | |
|---|---|---|---|
| 4,568,983 | 2/1986 | Bobick | 358/260 |
| 5,083,214 | 1/1992 | Knowles | 358/433 |
| 5,109,439 | 4/1992 | Honda | 358/433 |
| 5,123,061 | 6/1992 | Pritchard | 382/56 |
| 5,298,990 | 3/1994 | Otaka et al. | 358/433 |
| 5,420,693 | 5/1995 | Horiuchi et al. | 358/433 |

*Primary Examiner*—Stephen Brinich

[57] ABSTRACT

A data compression and decompression procedure for a serial printer handles data from a print swath that includes Y rows of pixel data. The procedure divides the print swath into N microbands of pixel data, with each microband including y rows of pixel data (where y×N≧Y). The procedure compresses each microband of the pixel data by breaking up the microband into microblocks and comparing data in each microblock with a seed value to arrive at a compressed microblock based upon data differences from the seed value. Each microblock comprises a block of pixel data that is m bits wide by y rows high, where m is a small fraction of M bits of pixel data that are printable by the printhead across a sheet. All microbands of a swath are subjected to the data compression procedure so as to create positionally corresponding sets of compressed data microblocks for all of the microbands. In preparation for printing, the procedure decompresses all N microbands of raster data by acting on each set of compressed microblocks to recreate a set of N microbands of decompressed pixel data. The procedure then feeds the N microbands of decompressed raster data, in parallel, to the printhead.

9 Claims, 4 Drawing Sheets

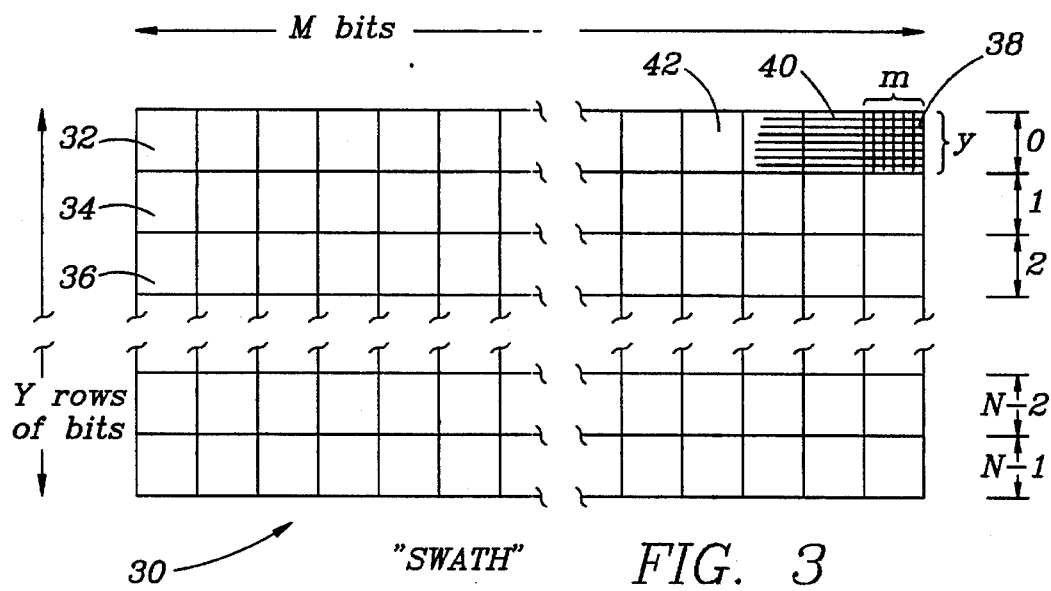
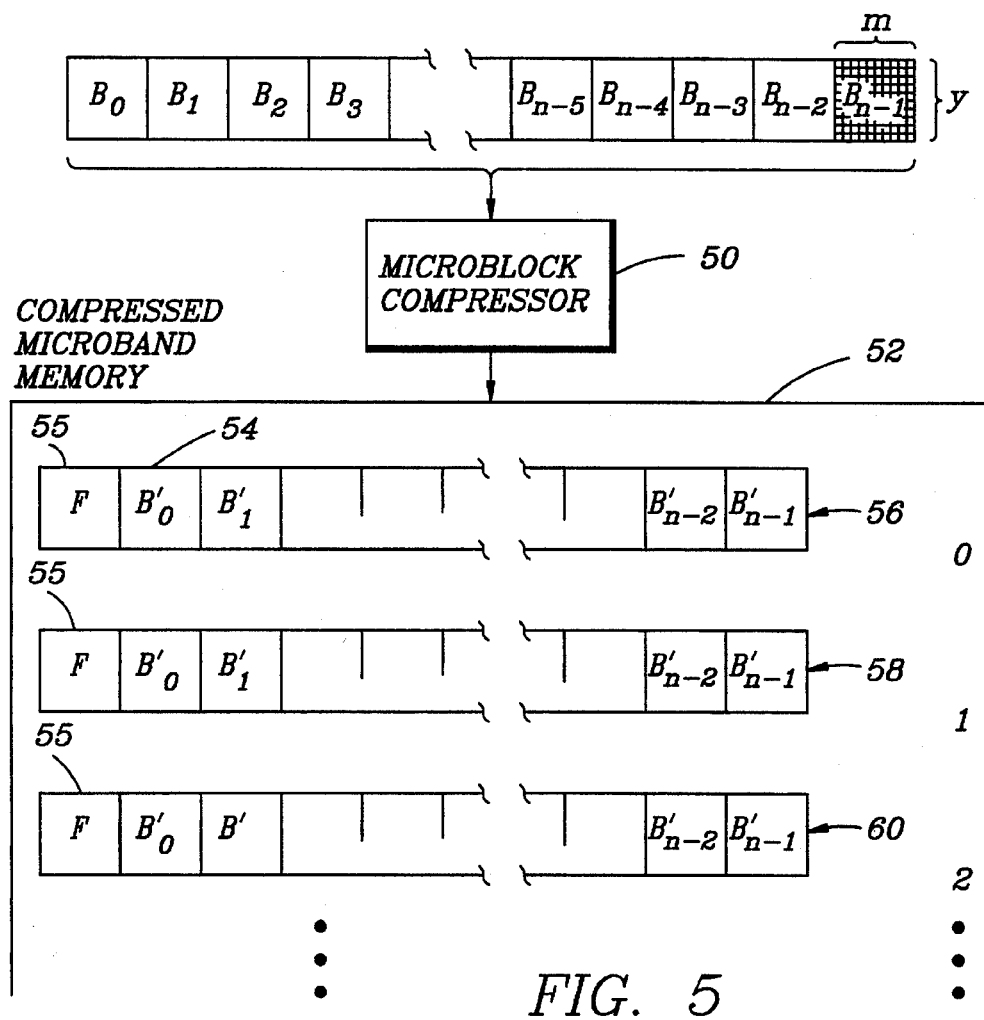

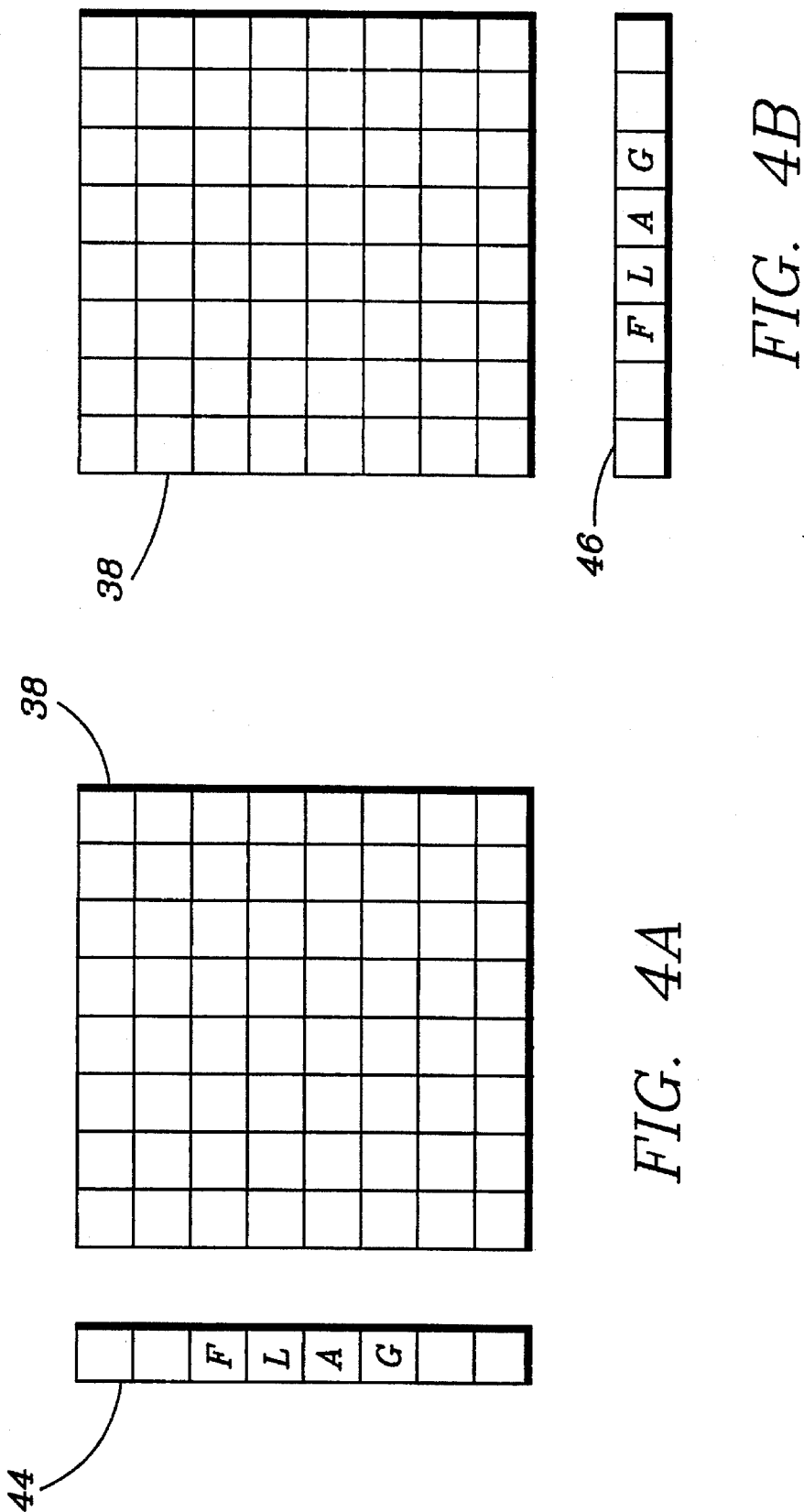

METHOD AND APPARATUS FOR COMPRESSION AND DECOMPRESSION OF DATA USED BY A SERIAL PRINTER

FIELD OF THE INVENTION

This invention relates to data compression and decompression and, more particularly, to a method for compressing and decompressing data that is particularly adapted for use in a serial printer, such as an ink jet printer.

BACKGROUND OF THE INVENTION

Ink jet printers serially scan a print head across a page in both left to right and right to left directions. In most ink jet printers, printing occurs in both scan directions. A widely used ink jet printhead includes a plurality of vertically oriented nozzles that are thermally actuated by appropriate pixel image-driven signals. Many popular ink jet printheads employ two vertically oriented rows of nozzles with one row being offset by half a line from the other row so as to enable highly dense ink jet dot patterns (e.g. 300 to 600 dots per inch). In FIG. 1, a schematic is shown of a sample nozzle arrangement that includes four parallel columns of nozzle pairs 10, 12, 14 and 16. Each column of nozzles is shown schematically by a vertical line. Each column of nozzles includes Y nozzles, where Y, for instance, may be 150. Nozzle pair 10 is employed to print black images and nozzle pairs 12, 14 and 16 are employed to print cyan, magenta and yellow images, respectively.

During printing, nozzle pairs 10, 12, 14 and 16 are moved across a page, in tandem, so as to enable multiple dot colors to be laid down. Each time the printhead is moved across a page, a swath of pixel/dot data is printed. Raster data for the printhead is stored in a random access memory (RAM) in horizontal raster form. The data in RAM is typically the full height of the printhead (Y rows of pixel data) and the RAM is sufficiently large to hold a full page-width swath. The allocated RAM size is often made twice the height of the printhead to enable buffering of a next print swath. As print engine designs allow for increased print resolution and larger values of Y, the amount of swath RAM increases—resulting in increased memory cost.

Various techniques in the prior art enable reduction of the amount of RAM required to store pixel data for an ink jet printer. One technique sends the data from a host processor to the printer in a columnar format that corresponds to the printhead swath height. This technique has the disadvantage of requiring the host processor's printer driver to recognize the printhead's configuration. However, most widely used printer driver languages are device—independent and do not include a capability for recognizing printhead configuration.

A further alternative to increasing the amount of RAM is to compress the swath memory, using a conventional compression algorithm, such as run—length encoding. The problem with such a compression method is, in general, that data can only be decompressed in the same order in which it was compressed. Thus, because the ink jet printhead prints in two directions, decoding must be handled differently for the direction that is in opposition to the direction in which the data was compressed. However, it isn't known in which direction the printhead will be traveling until after logic in the printer determines required margin positions for a number of contiguous rows. Such logic cannot be implemented until considerable data is brought into the swath RAM. Thus, if it is desired to reduce the amount of such data by compression, and it is compressed, such compression cannot occur until margin determination has occurred—to enable bilateral decoding of the compressed data. Thus, a "catch 22" situation occurs.

Margin determination on a page enables an ink jet printhead to be positioned at the beginning of a print line and thus assures a more rapid print operation. As shown in FIG. 2, a first print swath on a page 20 begins at point 22. During the time the printhead moves from left to right across page 20 and reaches the end of the line at point 24, logic determines where next line 28 begins (e.g. at point 26). The line beginning is determined from the initial dot of the right-most print position 26 of next line 28—as determined from a second swath stored in RAM. Thus, the control mechanism for the printhead causes the printhead to continue moving in a rightward direction after point 24 until its print nozzles are aligned with point 26 so that when page 22 is incremented, point 26 is below the printhead and printing can immediately start.

The prior art has derived a number of methods for matching data compression algorithms with bidirectional printing. U.S. Pat. No. 4,568,983 to Bobick describes a data compression/decompression technique for a laser printer wherein a document is divided into a plurality of strips, each strip representing plurality of scanned lines. Each strip comprises columns of words which are compressed using either run-length or Huffman encoding. Because such encoding techniques are difficult to decompress in a direction opposite to that in which they were compressed, the Bobick system requires additional processing overhead to cope with the opposite direction decompression.

A further prior art procedure—as evidenced in U.S. Pat. No. 5,123,061 to the inventor hereof (and assigned to the same Assignee as this application) teaches that each horizontal row of swath raster data is compressed individually, based upon a proceeding row's values. Thus the method compares a first row of raster data with a second row. If the second row is identical to the first row, then the first row is stored and a flag signals the identity of the second row to the first row. If the first row is a reference row (e.g. all zeros), only the flag needs to be stored.

U.S. patent application Ser. No. 08/171,315, entitled "A Reversible Video Compression Method" to Morrison et al. (assigned to the same Assignee as this application) describes a further compression procedure. The Morrison et al. method compresses a row of pixel data in a first direction. When the compressed swath of raster data needs to be decompressed in a direction opposite to that in which it was compressed, the decompression procedure operates on a pixel row by pixel row basis and steps backwardly through the compressed data on a data segment by data segment basis. Each data segment is decompressed in the direction in which it was compressed, and the procedure repeats for the next data segment, etc.

To the present, there are no known compression/decompression procedures which will support bidirectional operation of an ink jet printer. Past solutions have required use of uncompressed pixel data. As the complexity of ink jet printheads increase (e.g. multicolor ink jet nozzle configurations, increased numbers of nozzles, higher resolution dot configurations), additional RAM is required to store increased quantities of the uncompressed pixel data.

Accordingly, it is an object of this invention to provide a data compression and decompression procedure for an ink jet printer whereby high speed bidirectional printing is enabled.

It is another object of this invention to provide a data compression/decompression procedure which enables a wide swath of pixel data to be rapidly compressed without requiring a large array of dedicated compression hardware.

It is yet another object of this invention to provide an improved ink jet printer apparatus that enables parallel compression/decompression of a swath of raster data in a manner to enable raster memory minimization and bidirectional printhead operation.

SUMMARY OF THE INVENTION

A data compression and decompression procedure for a serial printer handles data from a print swath that includes Y rows of pixel data. The procedure divides the print swath into N microbands of pixel data, with each microband including y rows of pixel data (where y×N≧Y). The procedure compresses each microband of the pixel data by breaking up the microband into microblocks and comparing data in each microblock with a seed value to arrive at a compressed microblock based upon data differences from the seed value. Each microblock comprises a block of pixel data that is m bits wide by y rows high, where m is a small fraction of M bits of pixel data that are printable by the printhead across a sheet. All microbands of a swath are subjected to the data compression procedure so as to create positionally corresponding sets of compressed data microblocks for all of the microbands. In preparation for printing, the procedure decompresses all N microbands of raster data by acting on each set of compressed microblocks to recreate a set of N microbands of decompressed pixel data. The procedure then feeds the N microbands of decompressed raster data, in parallel, to the printhead.

DESCRIPTION OF THE DRAWINGS

FIG. 3 is a schematic illustration of an ink jet print swath which has been divided into N microbands of raster print data, each microband further subdivided into plural microblocks;

FIG. 4a is a schematic showing of a microblock and illustrates adjacent flag data which indicates whether corresponding rows of the microblock have or have not been compressed;

FIG. 4b is a schematic showing of a microblock and illustrates adjacent flag data which indicates whether corresponding columns have or have not been compressed;

FIG. 5 is a schematic block diagram illustrating the microblock compression action of the invention.

DETAILED DESCRIPTION OF THE INVENTION

Figure 1:
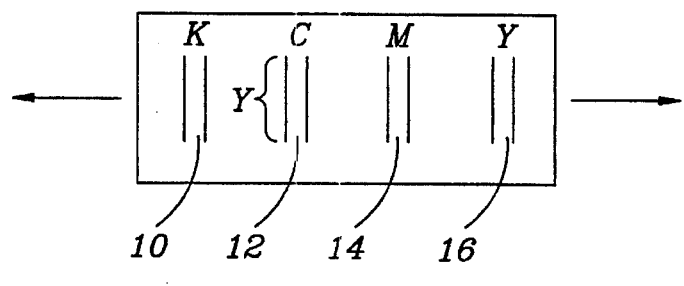
FIG. 1 is a schematic showing of a prior art multicolor ink jet nozzle configuration.
Figure 2:
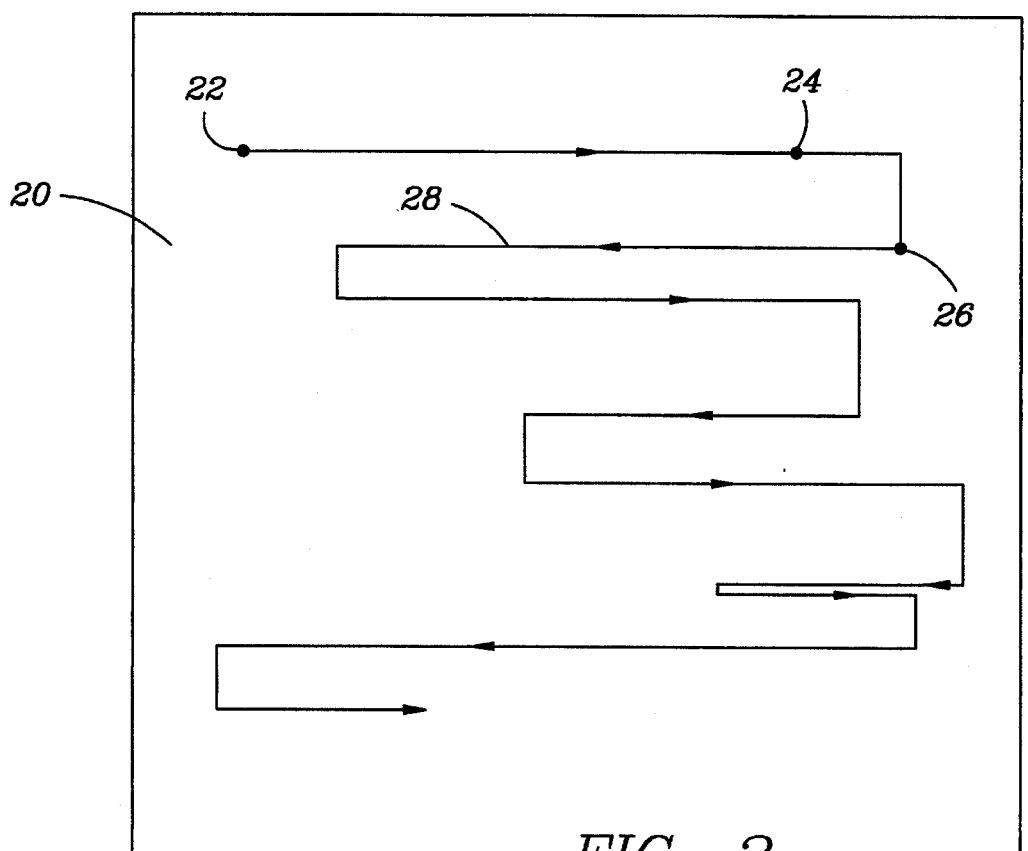
FIG. 2 is a schematic showing of an exemplary print path as an ink jet printhead traverses across a page while performing bidirectional print actions.

Turning to FIG. 3, a swath 30 of raster data includes Y rows and is M bits wide. Each swath 30 is broken up into N microbands 32, 34, 36, etc. Each microband is y bits wide and is up to M bits long. Each microband (e.g. 32) is further subdivided into a plurality of microblocks 40, 42, etc. Each microblock is n bits long by y bits wide. All microblocks 38, 40, 42 etc. are of identical size and typically may be 8×8 or 16×16 bits (i.e. pixels). Each microblock is provided with an encoding flag word (not shown) whose bits indicate whether a corresponding row (or column) has been encoded.

In FIG. 4a, a microblock 38 is shown comprising an 8×8 matrix of bit positions. A flag byte 44 is appended to microblock 38 and includes a bit position for each row of microblock 38. In FIG. 4b, microblock 38 is again shown, but in this instance, a flag byte 46 has a bit position for each column of microblock 38. The microblocks of FIGS. 4a and 4b may both be encoded on a "delta" basis wherein a current row (or column) is compared with a preceding row (or column) and if the data states are identical, the current row (or column) is not stored and a value is entered into the flag byte indicating that the current row's (or column's) value can be obtained from the immediately preceding row (or column), etc. Thus, if a current row (or column) in a microblock is different from a previous row (or column), a one is written to its corresponding flag bit, whereas if the data is the same, a zero is written to its corresponding flag bit. In the case where the current row (or column) data is different, the actual data is retained in the compressed microblock.

Similarly, the microblocks of FIGS. 4a and 4b may be compressed based upon differences from a pre-established seed value. For instance, if all values in a row (or column) are 0's (with "0" being the seed value), the row (or column) is omitted and an associated flag bit is assigned a value that indicates the absent row (or column). If the row (or column) is not all 0's, the row (or column) remains and a different flag bit is assigned.

Referring to FIG. 5, a microband 32 comprises uncompressed microblocks $B_0$–$B_{n-1}$, each microblock m bits wide by y bits high. Using one of the encoding techniques described in relation to FIGS. 4a and 4b, a microblock compressor 50 starts with microblock $B_0$ and compresses the data therein to create a compressed microblock $B_0'$ whose values are then inserted into a compressed microband memory 52 at area 54. At the same time, a flag value is assigned to the microblock in area 54 indicating whether it is or is not compressed. That flag value is stored in flag block 55.

Microblock compressor 50 further proceeds along microband 30, compressing each of the microblocks therein and storing their compressed values in compressed microband 56. Assuming that microband 56 corresponds to microband 0 of swath 30 (see FIG. 3), each of the compressed microblocks $B_0$–$B'_{n-1}$ is associated therewith. Thereafter, microblock compressor 50 processes each of the microbands of swath 30 to produce subsequent compressed microbands 58, 60, etc., and derives their associated flag blocks 54.

The thus-compressed microblocks (and microbands) remain in compressed microband memory 52 until required for printing. At such time, a decompression action occurs to reconstruct the decompressed microband data structures. While the microblocks are shown as physically aligned in FIG. 5, it will be understood they may be stored anywhere in memory and without any physical alignment.

Figure 6:
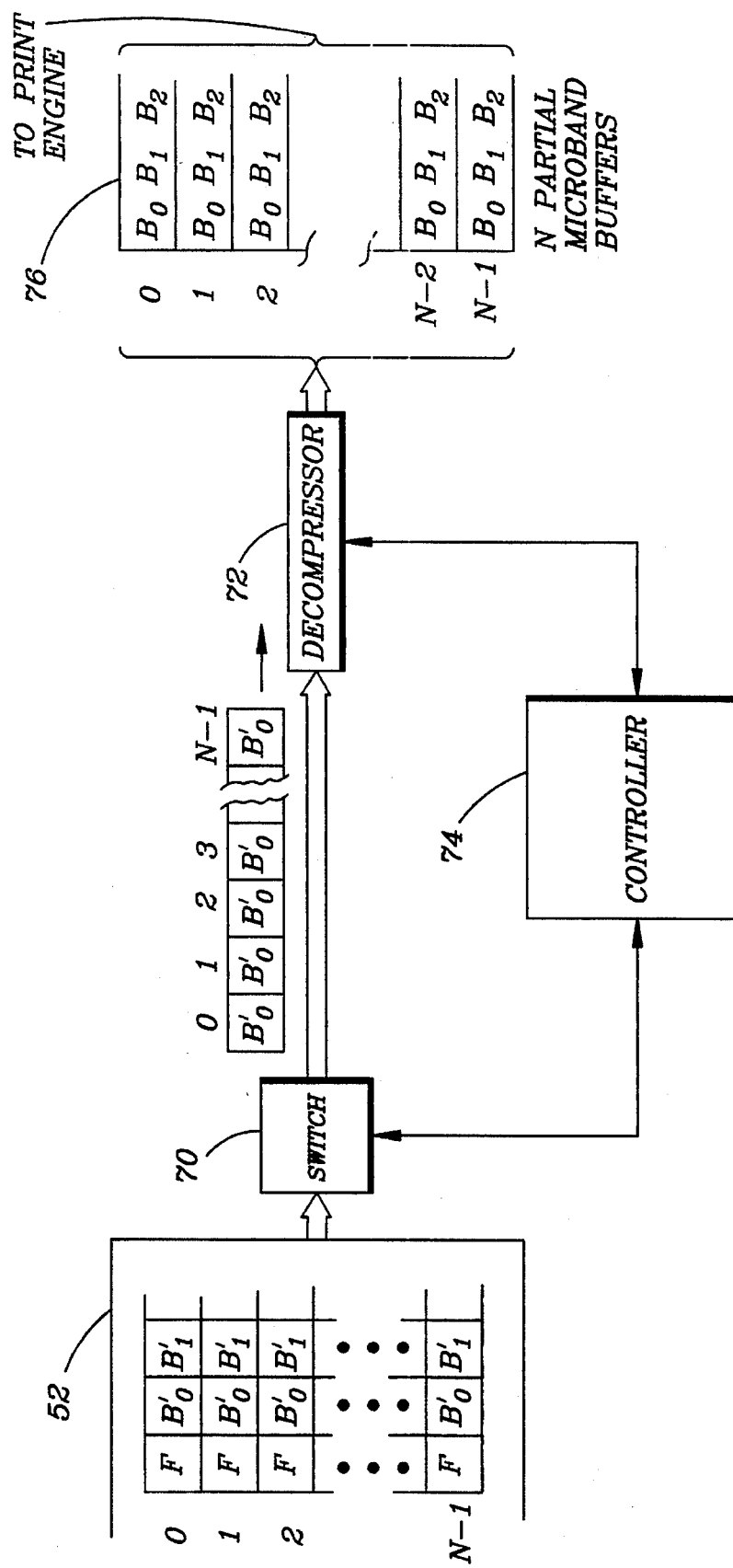
FIG. 6 is a schematic block diagram illustrating the parallel decompression action of the invention.

FIG. 6 shows a block diagram of a circuit for decompressing compressed microblocks that were compressed in accordance with the arrangement illustrated in FIG. 4a, and for providing the decompressed pixel data, via circuitry (not shown) to the printhead drivers and to a printhead that is traversing across a page. As indicated above, each of compressed microbands 0–N–1 are stored as a series of compressed microblocks in compressed microband memory 52.

Each compressed microblock occupies considerably less memory space (in general) than its associated uncompressed microblock.

To decompress the compressed microbands, a switching circuit 70 accesses a positionally corresponding set of compressed microblocks from microbands 0–N−1 and passes the set of accessed microblocks to a decompressor 72 microblock buffer 72. Assuming that the ink jet printhead is printing from left to right, switching circuit 70 accesses microblocks $B_0'$ from each of the microbands of the swath and serially transmits those compressed microblocks (as a set) to decompressor 72. This action renders immediately available compressed microblocks $B_0'$ in all microbands, for decompression.

Under control of a controller 74, decompressor 72 reconstructs the uncompressed $B_0$ microblocks, in accordance with their associated flag words and writes them, in parallel, into corresponding microband buffers 76. Each of the microband buffers 76 holds a small number of pixel columns that enables a printhead to be continually supplied with data.

After all decompressed microblocks of a set are inserted into microband buffers 76, their data is ready for printing and is fed, via circuitry (not shown) to the printhead drivers and to the ink jet printhead under control of controller 74. So long as the action of the circuit of FIG. 6 occurs at a faster rate than the rate at which the ink jet printhead requires data for printing, a "print overrun" does not occur.

By dividing each microband into plural microblocks, the problem of reverse-direction decompression can be handled by first counting the number of 1 bits in the flag word for the compressed microblock (i.e. the number of uncompressed words). Then, when the compressed microblock is accessed, the decompressor 72 knows where to commence decompression by the aforesaid count, and can work "forward" in the direction in which compression occurred for the short length of the microblock to accomplish decompression. When working forward, each bit of the flag byte indicates whether the corresponding microblock byte is to be used as is or is to be the same as the previous byte. As a result, the segmentation of each microband into microblocks enables highly efficient swath decompression to occur in a time frame that matches the needs of the ink jet printhead as it moves across a page.

If the microblocks are encoded as shown in the example of FIG. 4b, the decompression complexity for "reverse direction" decompression does not differ markedly from forward direction decompression, as each column of microblocks 38 needs only to be compared with its immediately preceding column (or with a seed value) to enable its decompression.

Lastly, if each microblock is encoded using a set seed value (e.g.="0") for all rows/columns, the level of compression will not be as great as for the above-described procedures. However, decompression can occur in either print direction—due to the use of the constant "seed value".

It should be understood that the foregoing description is only illustrative of the invention. Various alternatives and modifications can be devised by those skilled in the art without departing from the invention. For instance, while the size of a microblock (and flag byte) have been described as being a byte "wide", any appropriate bit length can be chosen. Accordingly, the present invention is intended to embrace all such alternatives, modifications and variances which fall within the scope of the appended claims.

I claim:

1. A data compression and decompression method for a printer having at least one printhead means which produces a swath of Y rows of pixel data in a single pass across a sheet, said method comprising the steps of:
   a. storing a microband of pixel data, a swath including N microbands, each microband including y rows of pixel data, where $N>=2$ and $y \times N >= Y$;
   b. compressing said microband of pixel data into compressed microblocks, a microblock comprising a block of pixel data that is m bits wide by y rows high, where m is a small fraction of M bits of pixel data that are printable by said printhead means across said sheet;
   c. repeating steps (a) and (b) for all remaining microbands of said swath, to thereby create compressed, positionally corresponding sets of microblocks for all said N microbands;
   d. decompressing all said N microbands of pixel data compressed in steps (b) and (c), said decompressing acting on each said compressed, positionally corresponding set of microblocks to recreate said N microbands of decompressed pixel data; and
   e. feeding said decompressed pixel data from said set of N microbands, in parallel, to said printhead means.

2. The data compression and decompression method as recited in claim 1, wherein steps (b) and (c) compress all said microblocks in a first scan direction and compress said pixel data in each microblock in said first direction and, wherein step (d) decompresses each set of N microblocks in said first direction, but decompresses sets of microblocks comprising a microband in a direction said swath is to be printed by said printhead means.

3. The data compression and decompression method as recited in claim 1, wherein a seed value employed during said decompressing step for each row of a microblock, except a first row, comprises m bits of pixel data in an immediately preceding row and said seed value for said first row is a set value.

4. The data compression and decompression method as recited in claim 1, wherein an additional data bit is associated with each row of a microblock to indicate whether said row has or has not been compressed.

5. The data compression and decompression method as recited in claim 1, wherein a constant seed value is employed during said compressing step so as to enable decompression to occur independent of a print direction.

6. A data compression and decompression method for a printer having at least one printhead means which produces a swath of Y rows of pixel data in a single pass across a sheet, said method comprising the steps of:
   a. storing a microband of pixel data, a swath including N microbands, each microband including y rows of pixel data, where $y \times N >= Y$;
   b. compressing said microband of pixel data by comparing each column of y pixel data with a seed value and if a column of pixel data is the same as said seed value, omitting said column and generating a flag value indicative of such omission;
   c. repeating steps (a) and (b) for all remaining microbands of said swath;
   d. decompressing all said N microbands of pixel data compressed in steps (b) and (c) to recreate said N microbands of decompressed pixel data; and
   e. feeding said decompressed pixel data from said set of N microbands, in parallel, to said printhead means.

7. The data compression and decompression method as recited in claim 5, wherein said seed value for each column of raster data, except a first column in a microband, comprises y bits of raster data in an immediately adjacent column and said seed value for said first column is a set value.

8. The data compression and decompression method as recited in claim 6, wherein an additional data bit is appended for each column of pixel data to indicate whether said column has or has not been compressed.

9. The data compression and decompression method as recited in claim 5, wherein said seed value is a set value.

* * * * *